(12) United States Patent
Campbell (10) Patent No.: US 7,984,010 B2
(45) Date of Patent: Jul. 19, 2011

(54) ACTION AGENDA DETERMINING APPARATUS

(75) Inventor: Nick Campbell, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 723 days.

(21) Appl. No.: 11/990,191

(22) PCT Filed: Oct. 18, 2005

(86) PCT No.: PCT/JP2005/019080
§ 371 (c)(1),
(2), (4) Date: Feb. 8, 2008

(87) PCT Pub. No.: WO2007/023576
PCT Pub. Date: Mar. 1, 2007

(65) Prior Publication Data
US 2010/0138380 A1    Jun. 3, 2010

(30) Foreign Application Priority Data

Aug. 25, 2005 (JP) ................................. 2005-243656

(51) Int. Cl.
*G10L 11/00* (2006.01)
*G10L 21/00* (2006.01)
*G06K 9/00* (2006.01)
(52) U.S. Cl. ........................... 706/58; 704/275; 382/118
(58) Field of Classification Search .................. 704/275; 382/118; 706/52, 58
See application file for complete search history.

(56) References Cited

U.S. PATENT DOCUMENTS

| 7,065,490 | B1 * | 6/2006 | Asano et al. | .................. 704/275 |
| 2003/0033266 | A1 | 2/2003 | Schott et al. | |
| 2005/0084141 | A1 * | 4/2005 | Kato et al. | .................... 382/118 |

FOREIGN PATENT DOCUMENTS

| JP | 2005-39681 | 2/2005 |
| JP | 2005-215901 | 8/2005 |
| JP | 2005-525609 | 8/2005 |
| WO | 2003/015028 | 2/2003 |

OTHER PUBLICATIONS

Scott Stillman et al. "towards reliable multimodal sensing in aware environments." ACM International Conference Proceeding Series; vol. 15, Proceeding of the 2001 workshop on Perceptive user interfaces, 2001, p. 3, left column, line 19 to right column, line 35; Fig. 3.
Kenji Sato et al., "Recognition and Explanation of Unusual Human Behavior in Intelligent House." Information Processing Society of Japan, FIT (Forum on Information Technology) 2003, LK-008, 2003. Full text; all drawings, and English translation thereof.

* cited by examiner

*Primary Examiner* — David R Vincent
*Assistant Examiner* — Ola Olude-Afolabi
(74) *Attorney, Agent, or Firm* — Harness, Dickey & Pierce, P.L.C.

(57) ABSTRACT

In one embodiment of the present invention, an action agenda determining apparatus for determining an agenda of action to be taken with reference to surrounding situation is provided. An action agenda determining apparatus includes a matching model storage unit for storing an action agenda determining model that has learned in advance relation between time-sequence of prescribed feature information related to human motion extracted from surrounding images and action agenda to be taken, and a model reference unit for forming the time-sequence of prescribed feature information from the surrounding motion images and referring to the action agenda determining model stored in the matching model storage unit, for determining the action agenda to be taken. Sound may be included as part of the feature information.

5 Claims, 6 Drawing Sheets

| time | A | B | C | D | E | F |
|------|---|---|---|---|---|---|
| .... | . | . | . | . | . | . |
| 3315 | - | y | - | - | - | - |
| 3316 | - | - | - | - | - | - |
| 3317 | - | y | \| | - | - | - |
| 3318 | - | y | \| | - | - | - |
| 3319 | - | \| | - | - | - | - |
| 3323 | - | \| | - | - | y | - |
| 3324 | - | \| | - | \| | - | y |
| 3325 | - | \| | - | \| | - | - |
| 3327 | - | \| | - | \| | - | y |
| 3328 | - | \| | - | - | - | y |
| 3332 | \| | \| | - | \| | - | - |
| 3333 | - | \| | - | \| | - | - |
| 3335 | - | \| | - | \| | - | - |
| 3336 | \| | \| | - | - | - | - |
| 3340 | - | \| | - | \| | t | - |
| 3341 | - | w | - | \| | t | - |
| 3342 | - | - | - | \| | t | - |
| 3345 | - | - | - | y | t | y |
| 3346 | - | - | - | y | t | - |
| 3347 | \| | - | - | y | t | - |
| 3348 | \| | - | - | y | t | - |
| 3350 | \| | - | - | w | t | - |
| 3351 | \| | w | p | w | t | w |
| 3352 | - | - | p | w | t | - |
| 3353 | - | - | p | w | t | - |
| 3355 | - | - | - | w | t | - |
| 3356 | - | - | - | \| | t | - |
| 3357 | - | - | - | - | t | - |
| 3360 | - | y | p | - | t | - |
| 3362 | y | y | p | - | t | - |
| 3363 | - | - | p | - | t | - |
| 3365 | y | - | p | - | t | - |
| 3366 | - | - | p | - | t | - |
| 3367 | y | - | p | - | t | - |
| 3369 | - | - | - | - | t | - |
| 3371 | - | - | - | - | - | - |
| 3372 | - | w | p | - | - | - |
| .... | | | | | | |
| SEX | m | f | m | f | f | m |
| AGE | s | j | j | m | s | m |
| LANGUAGE | j | j | j | j | j | e |

112 – time column
110 – PARTICIPANTS
114 – data region
116 – SEX
118 – AGE
120 – LANGUAGE

FIG. 7

| 130 | FACE | | | | | | HANDS | | | | | |
|---|---|---|---|---|---|---|---|---|---|---|---|---|
| | A | B | C | D | E | F | A | B | C | D | E | F |
| 3314 | – | r | l | r | l | – | b | b | b | r | l | b |
| 3316 | – | r | – | r | l | – | b | b | b | – | l | b |
| 3317 | d | r | – | r | l | r | b | b | b | – | – | b |
| 3318 | d | l | – | r | l | – | l | l | b | – | – | b |
| 3319 | d | l | – | r | l | r | l | l | b | – | – | b |
| 3320 | d | r | – | r | l | r | l | – | – | – | b | b |
| 3322 | d | r | – | r | l | r | l | – | – | – | b | b |
| 3326 | – | r | l | r | l | u | l | l | – | – | b | b |
| 3327 | l | r | – | r | l | u | l | r | – | r | b | b |
| 3334 | l | r | l | r | l | – | r | – | b | r | b | b |
| 3337 | – | l | l | r | – | – | – | – | – | r | – | b |
| 3338 | r | r | l | – | – | – | – | – | – | r | – | b |
| 3339 | r | r | – | – | – | l | – | – | – | r | – | b |
| 3340 | r | r | r | – | – | l | – | – | – | r | – | r |
| 3341 | r | r | r | – | r | l | – | – | – | r | b | r |
| 3343 | d | l | – | r | r | – | – | l | b | r | b | r |
| 3344 | d | r | – | r | r | – | – | b | b | r | b | r |
| 3345 | l | r | – | d | r | – | – | b | b | r | b | r |
| 3354 | l | r | l | d | – | l | – | b | – | l | – | r |
| 3355 | l | r | l | r | l | l | – | b | – | l | – | r |
| 3356 | d | r | r | r | l | l | b | l | b | l | – | r |
| 3359 | d | – | r | r | l | l | l | l | b | l | – | l |
| 3360 | d | – | r | r | l | l | l | b | b | l | – | l |
| 3361 | d | – | r | r | r | l | l | b | b | l | – | l |
| 3372 | l | – | r | r | r | l | l | b | b | l | – | l |

132 / 134

ACTION AGENDA DETERMINING APPARATUS

TECHNICAL FIELD

The present invention relates to an apparatus estimating surrounding circumstances from sounds and images, and determining an action agenda accordingly. More specifically, the present invention relates to an action agenda determining apparatus and a computer program, for determining action agenda to take action appropriate for the surrounding circumstances by effectively utilizing paralinguistic information related to human voice and information related to human motions obtained from the image.

BACKGROUND ART

Recently, electric home appliances and other products are increasingly being automated for higher convenience of life. Examples include a light that automatically turns on in response to a person entering a room and an electric toilet seat that opens in response to a person coming and standing in front of the seat. Such technique improves convenience of people's lives.

Other than the examples above, a television receiver system has been known that performs a prescribed process without any user operation. Patent Document 1 describes one such television receiver. According to the description of Patent Document 1, the television receiver accumulates viewing history of the user to determine user preference, and when it is determined that the user is watching a program different from a possibly preferable program in the same time zone as the broadcast time of the preferable program, the television receiver informs the user about the broadcasting of the preferable program on a different channel. Thus, the user will not fail to enjoy the preferable program.

Further advancement of such technique would enable an auto-control television receiver that automatically turns on/off the power at a time point determined in accordance with the viewing pattern of the user on the appropriate channel that matches the viewing pattern of the user, based on the viewing history of the user.

For instance, assume that a user views programs of a certain channel from 10:00 pm to 11:00 pm every night, from Monday to Friday. Using a common television receiver, the user must turn on the power and set the channel. Using the auto-control television system, however, the information that the user "views channel XX from 10:00 pm to 11:00 pm every evening from Monday to Friday" is automatically obtained from the program viewing history of the user. Based on the viewing history, the television receiver could turn on/off automatically and channel could be automatically set. Therefore, when the user is going to view the favorite program that the user always enjoys every Tuesday night at 10:00, it is unnecessary for the user to turn on the power and set the channel by himself/herself. At 10:00 every night, the power of television receiver turns on automatically and the channel is set to the channel of interest. Patent Document 1: Japanese Patent Laying-Open No. 2005-039681

DISCLOSURE OF THE INVENTION

Problems to Be Solved by the Invention

As described above, in an auto-control television receiver, the television receiver turns on/off automatically, reflecting the viewing pattern of the user. Therefore, possibility of the user missing his/her regularly viewed favorite program would be significantly reduced. Power on/off of the television receiver based only on the viewing pattern, however, may cause various problems.

Assume, for example, that the power of television receiver is turned on while people are talking about urgent and serious matter in the room. In such a case, it is often the case that the television receiver will be turned off immediately. This causes the user to turn the television receiver off again, which is originally unnecessary. Further, people taking part in the conversation would feel amiss. Such a problem arises as the television receiver cannot sense the atmosphere in the room.

Use of the auto-control television is not the only cause that possibly spoils the mood of people engaging in conversation due to an action interrupting the conversation initiated in a manner unfit for the atmosphere. A robot providing some service among a number of people, for example, may also cause such a situation.

Consider a robot acting autonomously to entertain people in places where many people gather. Assume that the robot has a function of talking to a person who is found to be alone and not participating in conversation. Determining, however, as to whether a participant is alone or not simply because he/she is having conversation or not may cause troubles.

Specifically, assume that three people are talking. Two are conversing, and the third one just stands by, without speaking. If the robot determines that the third person is alone without having conversation simply because he/she is not speaking, and talks to the third person, that would cause troubles. In such a situation, it may be the case that the person, though not actively engaging in the conversation, is intensively listening to the talk of the two persons. Then, the robot initiating a talk may divert the attention to the ongoing conversation of the two.

Such a situation often occurs when a number of persons participate in a conversation. Specifically, in a group of people, only some talk, others do not speak explicitly and seemingly not engaged in the conversation, but those not speaking are surely listening and participating in the occasion.

Though such a situation is common, a robot would not be able to appropriately respond to the situation and possibly interrupt indifferently, posing a problem. Humans can appropriately determine what action should be and should not be taken from various pieces of information. A robot that interacts with humans should also have such capabilities. From the viewpoint of interaction with humans, such capabilities should desirably be applied in a real-time operation.

Therefore, an object of the present invention is to provide an action agenda determining apparatus and a computer program that can determine an action agenda by appropriately determining what operation should be done, by sensing the atmosphere.

Another object of the present invention is to provide an action agenda determining apparatus and a computer program that can determine an action agenda by appropriately determining what operation should be done, by sensing human atmosphere.

A further object of the present invention is to provide an action agenda determining apparatus and a computer program that can determine an action agenda by appropriately determining, on a real-time basis, what operation should be done, by sensing human atmosphere.

Means for Solving the Problems

According to an aspect, the present invention provides an action agenda determining apparatus for determining an action agenda to be taken, from surrounding situation at a site where human presence is possible, including: a model storage unit for storing an action agenda determining model that has learned in advance relation between time-sequence of prescribed feature information related to human motion extracted from images of surroundings and action agenda to be taken; and a model reference unit for forming the time-sequence of prescribed feature information from motion images of surroundings and referring to the action agenda determining model stored in the model storage unit, for determining the action agenda to be taken.

By the action agenda determining apparatus, by making reference to a model in accordance with the time-sequence of prescribed features extracted from human motion, an action agenda is determined in accordance with a rule learned beforehand. Therefore, an apparatus that operates in auto-controlled manner can determine an action agenda by making reference to the human motion, and to operate accordingly. Therefore, an action appropriate for the atmosphere becomes possible, while inappropriate action or unnecessary operation can be avoided. As a result, an action agenda determining apparatus that can determine an action agenda by appropriately determining what operation should be done by sensing the atmosphere is provided.

Preferably, the model reference unit includes a skin color detecting unit for detecting skin-colored portion from each frame of the motion images, a tracking unit for identifying a combination of face and hands of one same person from the skin-colored portions detected by the skin color detecting unit and tracking the face and hands for each combination of the motion images, and a unit for determining action agenda by forming, frame by frame, the prescribed feature information from motions of face and hands of each person tracked by the tracking unit, and referring to the action agenda determination model stored in the model storage unit, using the prescribed feature information for a plurality of frames.

The action agenda determining apparatus can extract feature information for determining the action agenda to be taken, by making reference to tracked motions of face and hands of each person. Emotion, intention of an utterance and state of participation to the conversation can be estimated from such motions, by time-sequentially tracking the positions of one's face and hands. Thus, the action agenda can be determined in consideration of emotion, intention of the utterance and state of participation to the conversation of a person. As a result, an action agenda determining apparatus that can determine an action agenda by appropriately determining what operation should be done, by sensing human atmosphere is provided.

More preferably, the action agenda determining apparatus further includes a motion prediction model storage unit for storing motion prediction model related to motions of human face and hands, and the tracking unit includes a unit for identifying a combination of face and hands of one same person from the skin-colored portions detected by the skin color detecting unit, and a unit for tracking, for each combination identified by the identifying unit, motions of face and hands included in the combination, predicted based on the motion model stored in the motion prediction model storage unit.

By the action agenda determining apparatus, the face and hands are tracked, by making reference to motions of face and hands encompassed in the combination expected based on the motion estimation model. As the tracking is done in accordance with the estimation, fast and adequate tracking becomes possible. As a result, an action agenda determining apparatus that can determine an action agenda by appropriately determining, on a real-time basis, what operation should be done by sensing human atmosphere is provided.

More preferably, the action agenda determining apparatus further includes a face direction detecting unit for detecting the direction of each face, detected by a skin color detecting unit and tracked by the tracking unit, and the prescribed feature information includes pieces of information indicating position and direction of the face and position of the hands of each combination in each frame.

The action agenda determining apparatus can detect the direction of the face. Even if there is a person not speaking at all, it is possible to determine whether he/she is engaged in the conversation or not based on the direction of his/her face. Further, from the time-sequence information, pieces of information representing emotion, decision and the like of each person such as upward/downward motion of the face (nod) and reciprocating motion to left/right (shake) can be obtained. Therefore, an action agenda determining apparatus that can determine an action agenda by appropriately determining, on a real-time basis, what operation should be done, by sensing/ reading human atmosphere is provided.

More preferably, the action agenda determining model includes a sound-integrated type action agenda determining model that has learned in advance relation between the action agenda to be taken and a time sequence of image-sound integrated type feature information having the prescribed feature information related to human motion extracted from surrounding images and prescribed acoustic feature information formed based on sound information obtained from surrounding sound; and the model reference unit includes image-sound integrated type model reference unit for determining action agenda to be taken, by forming the image-sound integrated type feature information from surrounding motion images and sounds, and referring to the sound integrated type action agenda determining model stored in the model storage unit using time sequence of the image-sound integrated type feature information.

By the action agenda determining apparatus, the action agenda to be taken can be determined by making reference to the model and to the human motion and surrounding sound. Not only the motion but also sound is used in the integrated manner, providing much more information available for determining surrounding circumstances. Further, as the sound and motion are integrated, pieces of information that cannot be obtained only from the sound or only from the motion can be obtained. This enables more appropriate determination of surrounding circumstances. As a result, an action agenda determining apparatus that can determine an action agenda by appropriately determining, on a real-time basis, what operation should be done, by sensing/reading human atmosphere is provided.

More preferably, the surrounding sound is received by a microphone and converted to a sound signal, and the prescribed acoustic feature information includes an arbitrary combination of a piece of information representing presence/absence of utterance estimated based on the sound signal, and duration of utterance estimated based on the sound signal.

In the action agenda determining apparatus, the acoustic feature information consists of a combination of arbitrary pieces of information described above. Presence/absence of an utterance, duration of a speech and the like represent whether conversation is carried on or not, whether the conversation is vigorous or not, and so on. Therefore, by appropriately combining such pieces of information, the atmosphere can more precisely be acquired. As a result, an action agenda determining apparatus that can determine an action agenda by appropriately determining, on a real-time basis, what operation should be done, by sensing/reading human atmosphere is provided.

More preferably, surrounding sound is received separately by a plurality of directional microphones and converted to a plurality of sound signals, and the prescribed acoustic feature information includes an arbitrary combination of a piece of information representing direction of utterance estimated based on the plurality of sound signals, a piece of information representing presence/absence of utterance in each direction estimated based on the plurality of sound signals, and a piece of information of duration of utterance in each direction estimated based on the plurality of sound signals.

By the action agenda determining apparatus, the utterance direction as the direction where the sound is generated, whether any utterance is made in each utterance direction, or utterance duration of each utterance direction can be obtained as an element of acoustic feature. By integrating these pieces of information with the image information, it becomes possible to distinguish state of utterances made by a number of people at the site from each other. As a result, an action agenda determining apparatus that can determine an action agenda by appropriately determining, on a real-time basis, what operation should be done, by sensing human atmosphere of a site where a plurality of persons are present, is provided.

More preferably, the image/sound integrated type feature information includes an arbitrary combination of pieces of information representing presence/absence of any utterance estimated speaker by speaker, duration of utterance estimated speaker by speaker, volume of utterance sound estimated speaker by speaker, and a piece of information as to whether any relation is estimated between the surrounding persons.

By the action agenda determining apparatus, it is possible to determine the action agenda using information related to the utterance of each speaker as well as the information about the relation among the speakers. Therefore, feature information of wider range than the feature information extracted only from the sound or motion can be obtained. As a result, more adequate determination of action agenda becomes possible.

According to a second aspect, the present invention provides an action agenda determining apparatus for determining an action agenda to be taken, from surrounding situation at a site where human presence is possible, including: a model storage unit for storing an action agenda determining model that has learned in advance relation between time-sequence of prescribed acoustic feature information related to sound generated by a human extracted from surrounding sounds and action agenda to be taken; and a model reference unit for forming the time-sequence of prescribed acoustic feature information from the surrounding sounds and referring to the action agenda determining model stored in the model storage unit, for determining the action agenda to be taken.

By the action agenda determining apparatus, the information for determining the action agenda to be taken can be extracted by making reference to the model and to the surrounding sound. Therefore, it is possible for an apparatus that operates in an auto-controlled manner to determine the action agenda by making reference to the sound and to operate accordingly. As a result, an action that may cause people at the site to feel amiss can be avoided, and unnecessary operation of auto-control can be eliminated.

Preferably, the surrounding sound is received by a microphone and converted to a sound signal, and the prescribed acoustic feature information includes an arbitrary combination of a piece of information representing presence/absence of utterance estimated based on the sound signal, and duration of utterance estimated based on the sound signal.

In the action agenda determining apparatus, the acoustic feature information consists of a combination of arbitrary pieces of information. Therefore, by appropriately combining the pieces of information, necessary information to determine the action agenda can be obtained. As a result, the apparatus can be controlled automatically based on adequate action agenda.

More preferably, surrounding sound is received separately by a plurality of directional microphones and converted to a plurality of sound signals, and the prescribed acoustic feature information includes an arbitrary combination of a piece of information representing direction of utterance estimated based on the plurality of sound signals, a piece of information representing presence/absence of utterance estimated based on the plurality of sound signals, and a piece of information of duration of utterance estimated based on the plurality of sound signals.

By the action agenda determining apparatus, the utterance direction as the direction where the sound is generated can be obtained as an element of acoustic feature. Therefore, pieces of acoustic information of a plurality of people can be distinguished by making reference to the utterance direction. As a result, the action agenda can be determined, adequately predicting actions of the plurality of people.

The computer program recorded on the recording medium in accordance with a third aspect of the present invention causes, when executed by a computer, the computer to operate as any of the action agenda determining apparatuses described above.

DESCRIPTION OF REFERENCE CHARACTERS 42 an action agenda determining apparatus
62 a skin color detecting unit
64 a skin-colored portion distinguishing unit
66 a skin-colored portion tracking unit
68 a motion prediction model storage unit
74 a sound-motion integrating unit
76 a model reference unit
78 a matching model storage unit

BEST MODE FOR CARRYING OUT THE INVENTION

In the following, an embodiment of the present invention will be described with reference to the figures. The present embodiment relates to an apparatus, for a television receiver whose power and channel selection are controlled based on the viewing history, for determining action agenda as to whether power should automatically be turned on or not based on paralinguistic information and motion information obtained from surrounding atmosphere, when a program matching the viewing pattern of the user is to be broadcast.

<Configuration>

Figure 1:
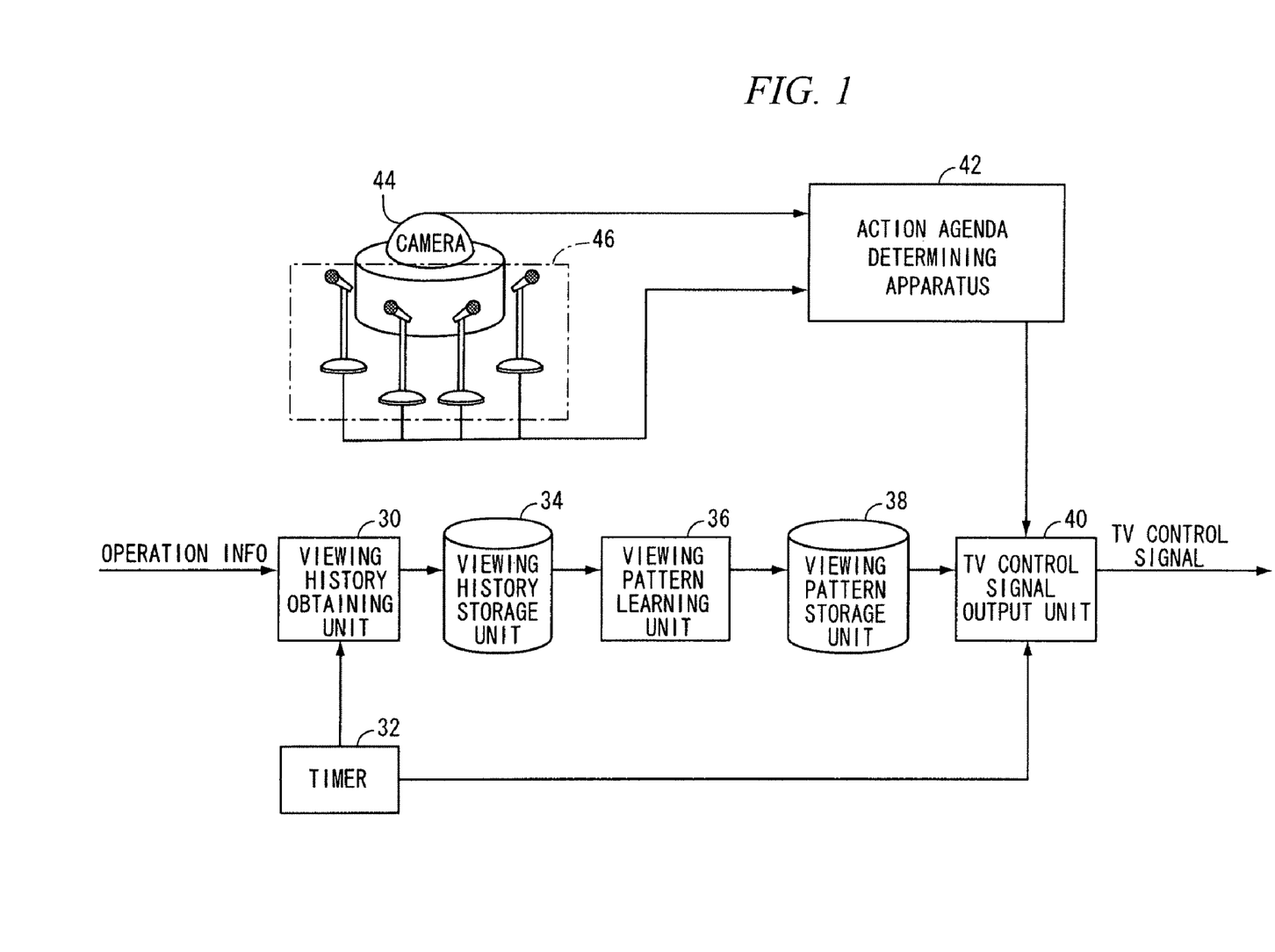
FIG. 1 shows, in the form of a block diagram, functions of the action agenda determining apparatus and the auto controlled television receiver system in accordance with an embodiment of the present invention.

FIG. 1 is a functional block diagram of an action agenda determining apparatus 42 mounted on an auto-controlled television receiver and auto-controlled television receiving system, in accordance with the present embodiment.

Referring to FIG. 1, the television receiver system includes: a viewing history obtaining unit 30 obtaining viewing history of a user, in accordance with a user operation through a switch provided on the body of television receiver, not shown, or through a remote control panel; a timer 32 counting time information used for obtaining the viewing history; a viewing history storage unit 34 storing the viewing history obtained by viewing history obtaining unit 30; a viewing pattern learning unit 36 for learning viewing pattern of the user from the viewing history stored in viewing history storage unit 34; a viewing pattern storage unit 38 storing the viewing pattern learned by viewing pattern learning unit 36; and a television control signal output unit 40 for outputting a signal for setting a channel of the television receiver and a signal controlling power on or off, with reference to the viewing pattern stored in viewing pattern storage unit 38.

The television receiver system further includes: a camera 44 installed to pick-up panoramic view of the room where the television receiver is placed; a plurality of directive microphones 46 capable of recording sound in the room where the television receiver is placed, in a manner clarifying from which direction the sound is produced; and an action agenda determining apparatus 42 synchronizing paralinguistic information associated with the sound made by persons in the room where the television receiver is placed and the information related to motions of the head and hands of persons, and extracting the relation between them using the image recorded by camera 44 and the sound picked-up by microphones 46, predicting human response, and extracting information indicating action agenda related to whether the power of television receiver should be turned on or not.

Here, paralinguistic information represents sound generated by a person except for the information related to the contents of the speech.

Specifically, it includes direction of utterance as the direction from which the sound comes, presence/absence of voice sound, length of sound duration and so on.

Figure 2:
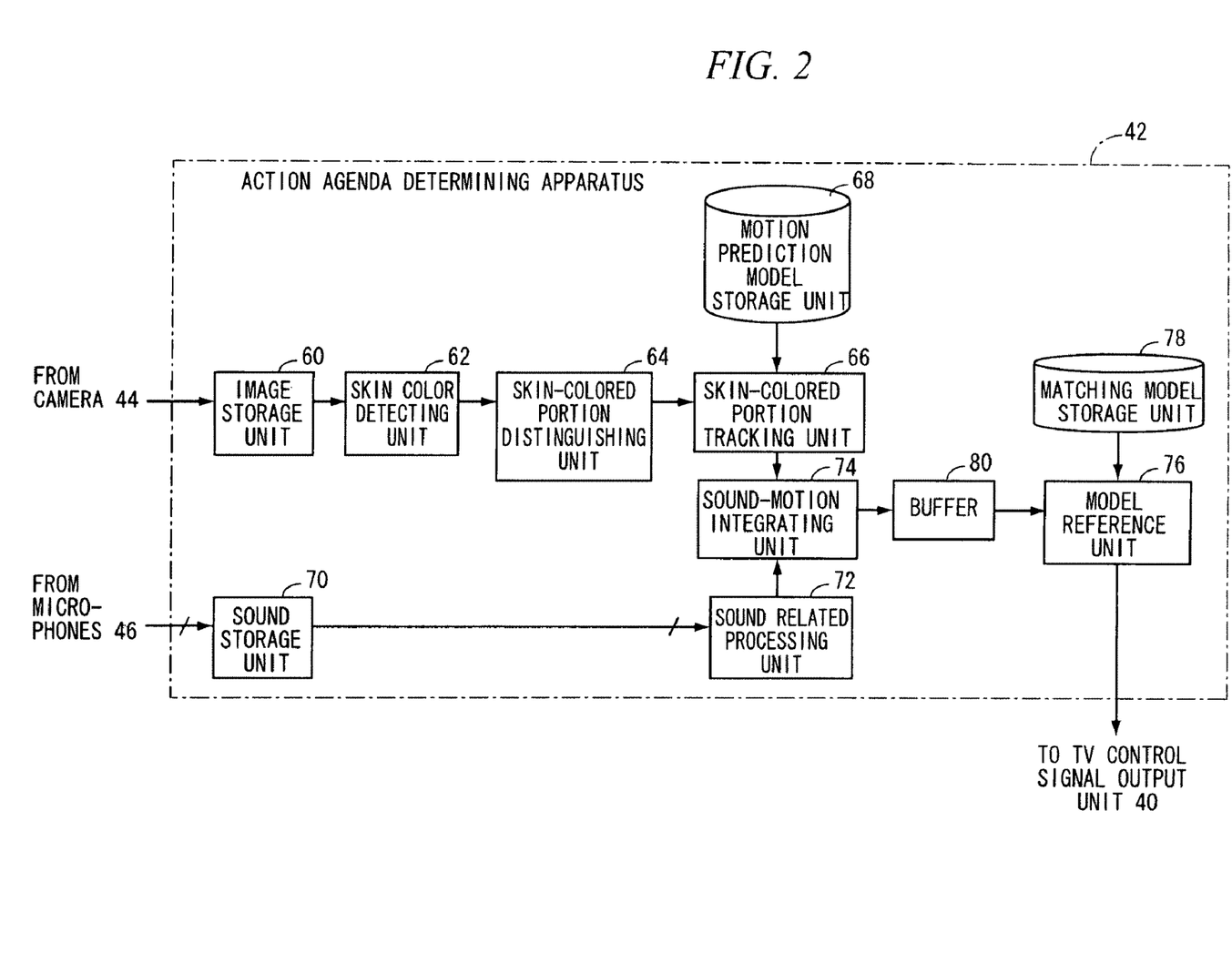
FIG. 2 shows, in the form of a block diagram, details of the action agenda determining apparatus.

FIG. 2 shows details of action agenda determining apparatus 42. Referring to FIG. 2, action agenda determining apparatus 42 includes: an image storage unit 60 storing the panoramic images recorded by camera 44 frame by frame; a skin color detecting unit 62 detecting portions of skin color in blobs and in real-time, from each frame of the images stored in image storage unit 60; a skin-colored portion distinguishing unit 64 distinguishing, from the blobs of skin-colored portions detected by skin color detecting unit 62, a portion generally at an upper position and larger in size as a face and a portion at a lower position and smaller in size as a hand, and allocating identification numbers to respective portions in accordance with a predetermined rule; a motion prediction model storage unit 68 storing a motion prediction model related to motions of human face and hands; and a skin-colored portion tracking unit 66 tracking, frame by frame, the face and hand motions distinguished and identified by identification numbers by skin-colored portion distinguishing unit 64, using the motion prediction model stored in motion prediction model storage unit 68.

Here, detection of skin color refers to a process of separating the skin color, considered to be the color of human skin, from other portions of the image. By this process, skin-colored portions are distinguished as a number of blobs from other portions of the image. Generally, when this process is executed on an image of one person, the face portion is detected as one skin-colored blob and hand portions are detected as two skin-colored blobs.

Action agenda determining unit 42 further includes: a sound storage unit 70 storing, in the form of frames, various sounds generated in the room and picked-up by microphones 46; a sound-related processing unit 72 for extracting, frame by frame, acoustic feature information related to presence/absence of human-generated sound, direction of sound generation and sound duration, from the sound stored in sound storage unit 70; and a sound-motion integrating unit 74 synchronizing the sound-related information processed by sound-related processing unit with the motion information tracked by skin-colored portion tracking unit 66, framing the result as a set of data at every prescribed time interval and thereby integrating pieces of image/sound feature information.

Action agenda determining unit 42 further includes: a matching model storage unit 78 for storing a matching model that has learned beforehand the relation between the image-sound integrated type feature information and the action agenda to be taken; a buffer 80 for temporarily storing only a prescribed frames of the image-sound integrated type feature information framed by sound-motion integrating unit 74 in FIFO (First In First Out) manner; and a model referencing unit 76 generating feature information from a number of latest frames of the image-sound integrated type feature information framed by sound-motion integrating unit 74, determining situation at the site independent of the contents of utterances by utilizing information related to the face and hand motions obtained from the sounds and images generated by the people therearound, with reference to the model stored in matching model storage unit 78, determining the action agenda as to whether the power of television receiver should be turned on or not, in YES/NO form, and applying the agenda to the television receiver.

Figure 3:
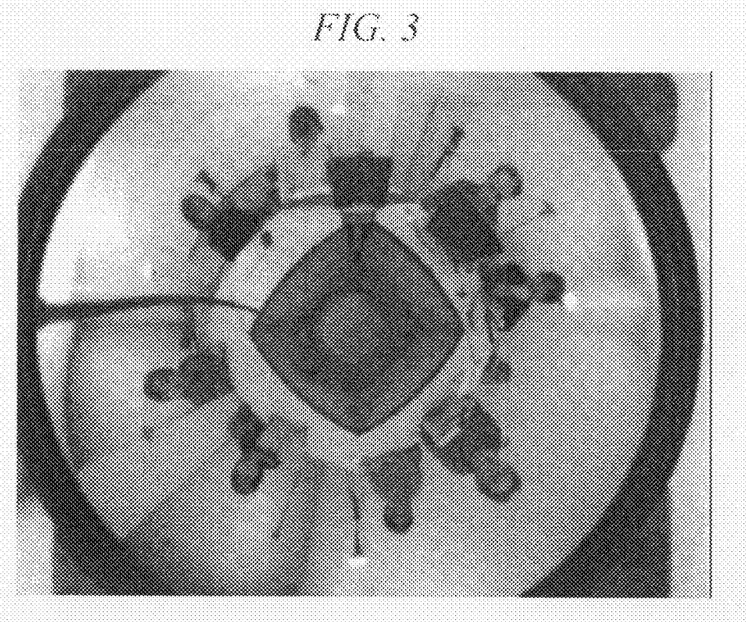
FIG. 3 shows an exemplary image picked-up by a camera.

FIG. 3 shows an example of the image picked-up by camera 44. Referring to FIG. 3, this example shows all participants of conversation sitting at a table in a room. For picking-up the image, an all-round view camera is installed at the center of the table. The resolution of the camera is not high enough to clearly follow the line of gaze of each person. As is mentioned with reference to FIG. 2, however, what is necessary in the process of skin-colored portion tracking unit 66 is simply to clarify the motions of face and hands, and not to clarify the motion of gaze. Therefore, video images picked-up by the camera of such resolution will suffice.

Figure 4:
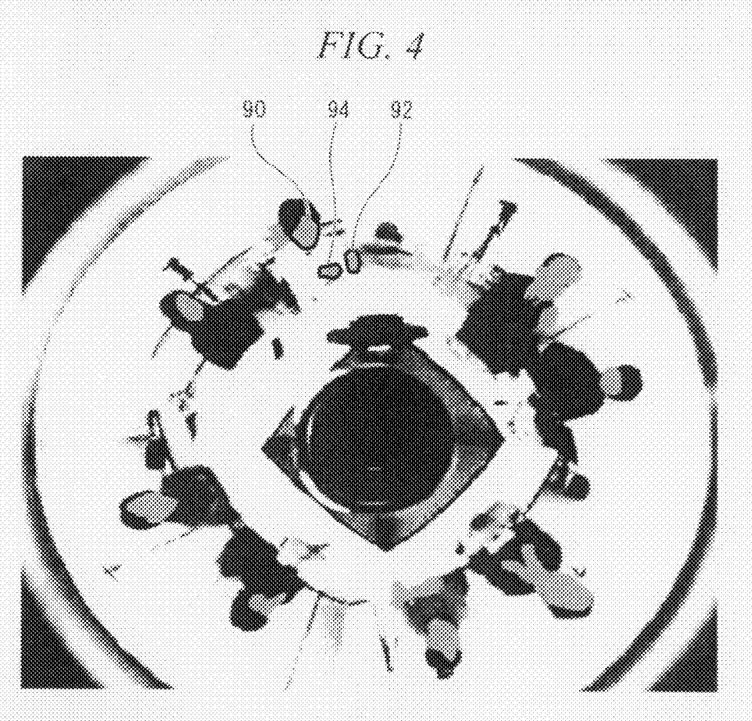
FIG. 4 shows an exemplary image subjected to skin-color detection process by a skin color detecting unit.

FIG. 4 shows an example of the image that has been subjected to the skin color detection process at skin color detecting unit 62. Here, description will be given on a person as an example. A skin-colored region 90 represents a face, a skin-colored region 92 represents a left hand, and a skin-colored region 94 represents a right hand, respectively. As can be seen from this example, generally, the face is positioned above the hands and larger in size. Further, there is one face and generally, there are two hands. Therefore, using the positional relation of high/low, size relation of large/small and numerical relation, a process of distinguishing skin-colored portions is performed by skin-colored portion distinguishing unit 64.

Figure 5:
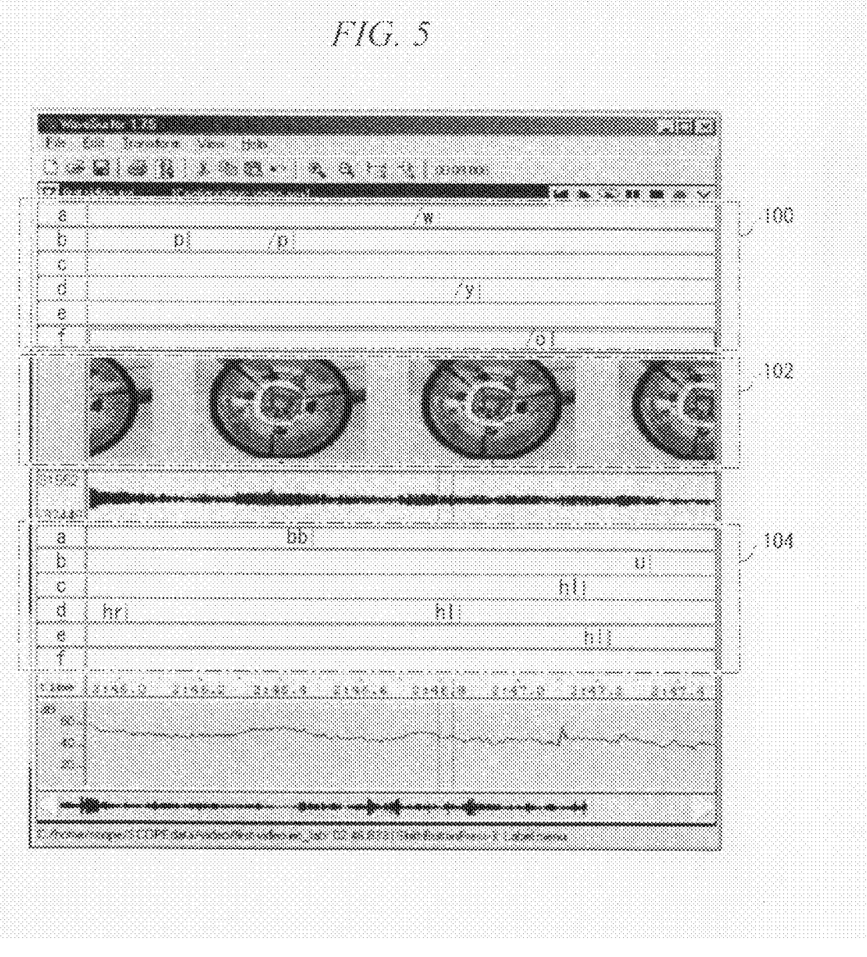
FIG. 5 shows an example of manual labeling methods used for forming a matching model stored in a matching model storage unit.

FIG. 5 shows an exemplary method of manual labeling used for forming a matching model to be stored in matching model storage unit 78. Referring to FIG. 5, first, a section 100 represents a result of manual labeling to sound related information. There are six different boxes (a to f), as there are six participants. Here, "a" represents participant A, "b" represents participant B, "c" represents participant C, "d" represents participant d, "e" represents participant E, and "f" represents participant F, respectively. Details of A to F will be described later. In the figure, other alphabets represent types of sound-related information. What are specifically represented by the alphabets used here will be described later.

A section 102 represents an image recording the condition of conversation to be referred to, for obtaining motion information. Manual tracking of motion, which will be described in the following, is performed with reference to the image.

A section 104 represents the result of manual tracking. As in section 100, there are six different boxes, as there are six participants. In the figure, other alphabets represent types of sound-related information. What the alphabets used here specifically represent will be described later.

Figure 6:
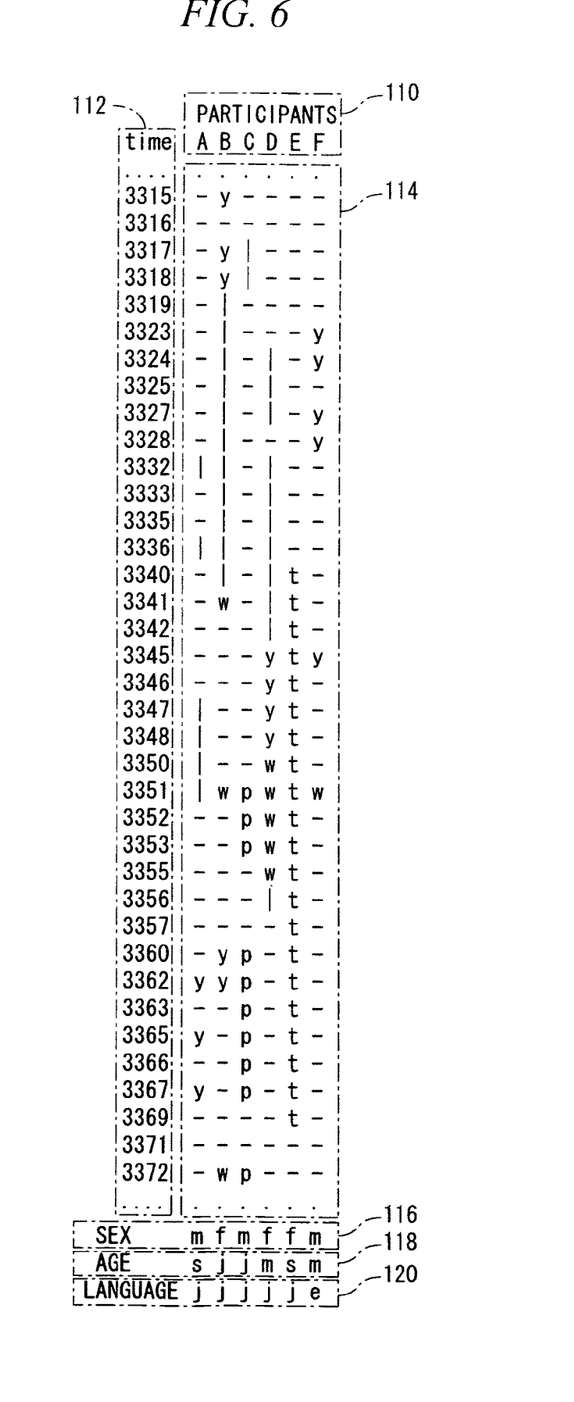
FIG. 6 shows time-sequential arrangement of participant-by-participant results of manual labeling to sound related information.

FIG. 6 shows results of manual labeling to sound related information given in section 100 (see FIG. 5), arranged time-sequentially for respective participants. Referring to FIG. 6, there are six participants 110 of the conversation here, that is, A, B, C, D, E and F.

A section 116 represents sex of participants. Here, alphabet "m" indicates "male" and "f" represents "female". Accordingly, A is a male, B a female, C a male, E a female, E a female and E a male.

Further, a section 118 represents age of the participants. Here, "s" represents "senior", "j" represents "junior" and "m" represents mid level. Accordingly, A is a senior, B is a junior, C is a junior, D is middle aged, E is a senior and F is middle aged.

Further, a section 120 represents languages used by the participants. Here, "j" represents Japanese and "e" represents English. It can be seen that A to E speak Japanese, and F speaks English.

Further, a column 112 represents time lapse from the start of utterance, in seconds.

A section 114 represents results of manual labeling to sound related information. Here, "y" represents affirmation, "p" represents local conversation by some of the participants, "t" represents translation or explanation, and "w" represents laugh. Further, a vertical bar in the figure represents an utterance being made, and a horizontal bar represents silence. Specifically, when vertical bars continue, it means that the corresponding person is continuously speaking. When horizontal bars continue, it means that the person remains silent. Six columns of signs in section 114 represent utterance information of six participants. By way of example, we can see from utterance time 3315 to 3341 seconds of participant B that she made an utterance of affirmation at 3315, paused at 3316, continued speaking from 3317 to 3341 and laughed at the last second 3341.

Figure 7:
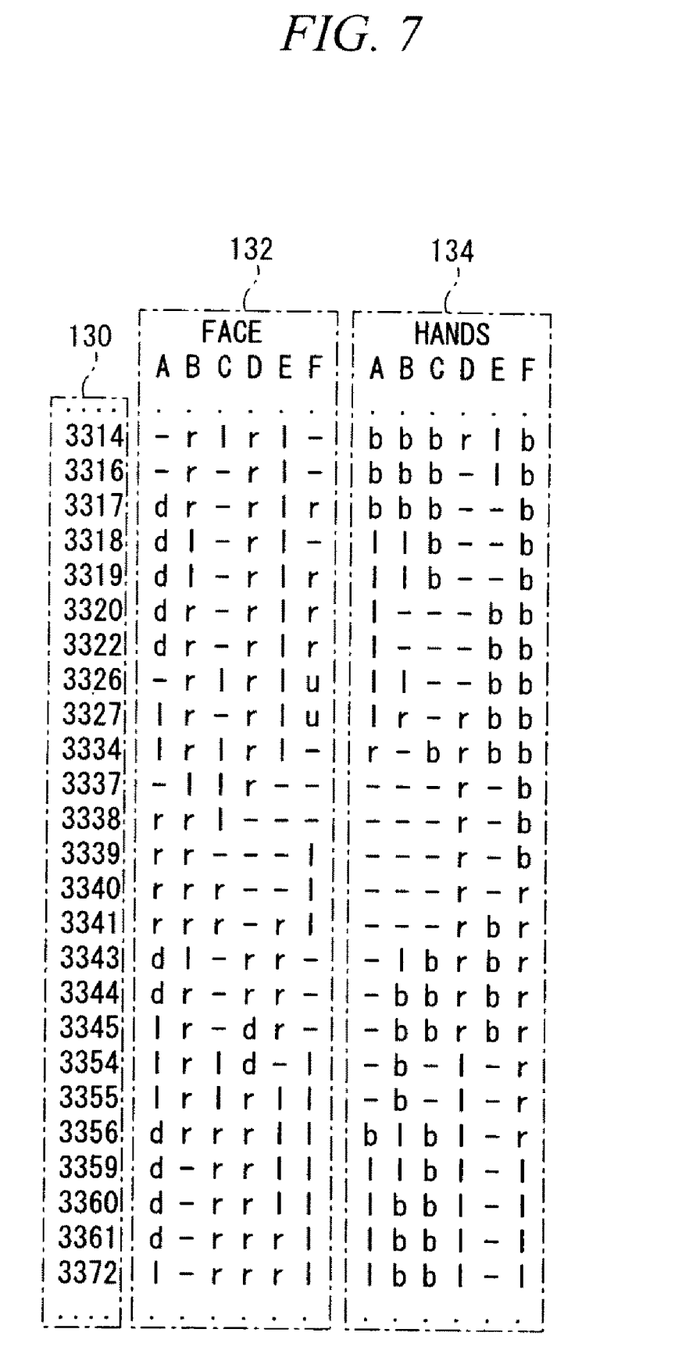
FIG. 7 shows time-sequential arrangement of participant-by-participant results of manual labeling to motion information.

FIG. 7 shows the result of manual labeling to the motion information given in section 104 (see FIG. 5), arranged time-sequentially for respective participants.

Referring to FIG. 7, there are six participants A to F, same as those discussed with reference to FIG. 6.

Column 130 represents time of utterance in seconds.

A section 132 indicates face motion of the participants. Here, alphabet "u" represents upward motion, "d" a downward motion, "r" represents rightward motion and "l" represents leftward motion of the face.

A section 134 indicates hand motion of the participants. Alphabet "r" represents right hand motion and "l" represents left hand motion, and "b" represents motion of both hands.

Six columns of section 132 and six columns in section 134 of FIG. 7 also represent motion information of six participants, similar to section 114 of FIG. 6. For instance, with reference to sections 132 and 134, we can see that participant B moves both hands while looking to the right from utterance time 3314 to 3317 seconds, while she moves the left hand while looking to the left, from 3318 to 3319 seconds.

The face motions and hand motions shown in FIG. 7 and paralinguistic information shown in FIG. 6 are synchronized, whereby sound-motion information independent of the contents of utterance can be obtained. From the sound-motion information, a model for controlling the auto-controlled television receiver system in accordance with an embodiment of the present invention can be constructed. By way of example, let us consider a model for determining whether interruption of an outsider is acceptable or not, where certain paralinguistic information and certain motions are present. In order to form the model, it is necessary to find how the participants of conversation felt when an outsider interrupted the conversation arbitrarily, that is, to research whether interruption of the conversation was uncomfortable or not. By applying the result of research to the already obtained sound-motion information, accumulating such pieces of information and performing some machine learning, a model can be formed to determine at what circumstance an outsider may interrupt the conversation. The model is referred to when determining whether an interruption of conversation by the auto-controlled television receiver, that is, turning on of the television receiver, is acceptable or not.

Available examples of the model may include neural network, HMM (Hidden Markov Model), SVM (Support Vector Machine) and MLP (Multi Layered Perceptron).

<Operation>

Referring to FIG. 1, first, a user turns on the power of television receiver and changes the channel to watch a program, using a remote control panel or a switch provided on the body of television receiver, not shown.

Next, in response to the power on and to determination of the channel, viewing history obtaining unit 30 obtains the viewing history including the channel number and the date and time when the channel was determined. For obtaining the viewing history, result of measurement by timer 32 measuring the date and time when the channel was determined, is used. Such viewing history obtaining process is performed similarly, every time the user changes the channel to view a program on a different channel. When the user finishes viewing the program on the television receiver and turns off the power of television receiver, the date and time of power off are also obtained as information related to the viewing history. With the viewing history thus obtained, it becomes clear the program of which channel was selected from what time of what day of what month.

The viewing history obtained by viewing history obtaining unit 30 is stored and accumulated in viewing history storage unit 34. From the viewing history stored in viewing history storage unit 34, viewing pattern learning unit 36 learns the viewing pattern of the user. Here, the viewing pattern specifically means such a pattern that the user always views a program broadcast on a certain channel at regular time, five times a week from Monday to Friday, or he/she always views a program broadcast on a certain channel once a week on Sunday. The viewing pattern learned by viewing pattern learning unit 36 is stored in viewing pattern storage unit 38.

By making reference to the viewing pattern stored in viewing pattern storage unit 38 and the count result by timer 32, television control signal output unit 40 turns on the power of television receiver and sets the channel. Specifically, the power of television receiver is automatically turned on, at the date and time matching the viewing pattern on the channel matching the viewing pattern of the user.

When the power of television receiver is turned on, the action agenda determining information determined by action agenda determining apparatus 42 using the video images picked-up by camera 44 and sound recorded by microphones 46 are used for reference.

Camera 44 is provided at such a position that it can pick-up the panoramic view of the room where the television receiver in accordance with the embodiment of the present invention is placed. As an example, an all-round camera may be installed at the ceiling.

The sound recorded by microphones 46 must be consistent with the images picked-up by camera 44. In other words, the sound and image of the same site must be collected and recorded by the camera and microphones. Therefore, desirably, microphones 46 and camera 44 are placed close to each other. As an example, the microphones may be arranged surrounding the all-round camera provided on the ceiling.

Next, action agenda determining apparatus 42 will be described. Referring to FIG. 2, first, images picked-up by camera 44 are framed at the rate of 15 frames per second, and stored in image storage unit 60. For each frame, skin-colored region (90 to 94 of FIG. 4) are detected on a real-time basis, from the stored image, by skin color detecting unit 62.

Next, skin-colored portion distinguishing unit 64 distinguishes the types of skin-colored regions separated from other portions of the image by skin color detecting unit 62. Specifically, among the skin-colored regions, which region is a face and which region is a hand can be distinguished. Generally, among skin-colored blobs, relatively large portion (90) at a higher position is considered to be a face, and a relatively small portion (92 and 94) at a lower position is considered to be a hand. Therefore, the portion distinguishing process is performed by comparing the high/low relation and large/small relation of the skin-colored blobs.

Next, skin-colored portion tracking unit 66 tracks the skin-colored regions distinguished by skin-colored portion distinguishing unit 64. Specifically, the process of establishing correspondence between the skin-colored region detected in a frame and a skin-colored region detected in the next frame, is repeated every time a piece of information related to the skin-colored region of each frame is applied. For the process by skin-colored portion tracking unit 66, a motion prediction model formed in advance from data collecting various human motions is referred to. The data models are stored in motion prediction model storage unit 68. From the result of tracking by skin-colored portion tracking unit 66, positions where the face and hands would highly possibly be positioned in the next frame are predicted based on the motion prediction model.

When such a motion prediction model is used, it becomes possible to predict the subsequent motion to some extent and, therefore, the process at skin-colored portion tracking unit 66 can be accelerated. For instance, assume that while motions of a person are tracked, his/her hand is hidden behind furniture and goes out of the field of the camera 44. If motion prediction model can be referred to, the positions of face and hands as the objects of tracking can be predicted to some extent even if tracking is imperfect as above. Further, by comparing the tracking result with the motion prediction model, apparent error of tracking result can be detected and tracking accuracy can be improved.

Using the motions obtained in this manner by the tracking process by skin-colored portion tracking unit 66, matching process is performed by sound-motion integrating unit 74. Details of the process will be described later.

The sound collected by microphones 46 is stored in sound storage unit 70. Sound-related processing unit 72 extracts prescribed acoustic feature information from the sound stored in sound storage unit 70.

Specifically, sound-related processing unit 72 clarifies from which direction of the room the sound comes, that is, direction of utterance. Microphones 46 are directive microphones and, therefore, by comparing levels of a plurality of sound signals obtained by the microphones, it is possible to find the direction of production of the recorded sound. The direction is labeled in accordance with a predetermined rule. By way of example, a direction is determined to be a base line, at which degrees clockwise from the base the position of sound generation is located is found, and each sound is labeled with the found degrees.

Sound-related processing unit 72 also processes information related to presence/absence of sound. For instance, when any sound is produced at any direction, "1" is labeled as sound presence/absence information, and when no sound is produced in any direction, "0" is labeled.

Further, sound-related processing unit 72 processes information related to sound duration. For instance, when any sound continues, label "1" is allotted as sound presence/absence information to the corresponding frame in the process related to sound presence/absence described above. Each frame of sound information includes time information. Therefore, by measuring the duration of frames having label "1" as the sound presence/absence information, information related to the length of the sound can also be obtained.

By integrating the acoustic feature information including the direction of utterance, presence/absence of utterance, and the length of the sound, the direction from which the sound comes is revealed. Further, the duration of that sound coming from the direction is also revealed.

The acoustic feature information and the information related to images obtained by skin-colored portion tracking unit 66 are synchronized and integrated by sound-motion integrating unit 74. At the time of this integrating process, time information included in each piece of information is referred to, in order to find the relation between the pieces of acoustic and motion information. For example, first, from motion information, the number of speakers appearing in the image and positions of the speakers can be found. By comparing such information with the sound directions, possible speaker can be estimated. When someone starts speaking and one of two persons, different from the speaker, sitting next to each other start speaking in a low voice lagged behind the speech of the first speaker, a situation is considered that one of the two persons is explaining to the other person the contents of the speech by the speaker.

From the motion of one's face, it is possible to determine whether he/she agrees to the contents of the speaker during his/her speech. If a short, regular sound to the rhythm of utterance by the speaker is heard, it may be estimated that someone is producing affirming voice. Similarly, if one's head moves up/down regularly to the rhythm of utterance by the speaker, it may be estimated that he/she is nodding. Further, if one's face is in the speaker's direction, it can be estimated that he/she is listening to the speaker, even when the affirming voice inferred form the sound or the nod inferred from upward/downward motion of one's head is absent.

Another example that can be estimated from face direction is as follows. When one does not generate any sound but turns his/her face alternately to a plurality of persons, it means that the plurality of persons being gazed at are dominant speakers of the conversation. As can be seen from the examples above, even when a person does not explicitly return any answer to the speaker, it is relatively easily recognized who is participating in the conversation and who is not, from such paralinguistic information.

Sound-motion integrating unit 74 generates the information that is obtained by processing the acoustic feature information and motion information in an integrated manner, adds the generated information to the acoustic feature information and motion information, frames the result at every prescribed time interval, and outputs the result to buffer 80. In the following, the acoustic feature information, motion information and the information obtained by integrating these, will be referred to as sound-motion integrated information.

Buffer 80 stores a prescribed number of frames of the sound-motion integrated information output from sound-motion integrating unit 74 in FIFO manner. Model reference unit 76 reads, from the time sequence of sound-motion integrated information stored in buffer 80, a prescribed number of latest frames, refers to the matching model stored in matching model storage unit 78 using the data of these frames as an input, and obtains an output of matching model. The output represents the action agenda as to whether the power of television receiver may be turned on or not at present. Specifically, the output of matching model assumes either one of the values allowing and not allowing power on.

The matching model represents a model prepared by using recorded images and sounds of conversation of a plurality of participants. Here, assume a model for determining whether interruption by an outsider amid the conversation is acceptable or not during a conversation of a group of people, as the matching model. This model can be used to determine the action agenda as to whether the television receiver may be turned on or not.

Generally, in a conversation, someone speaks about something, and other members of the group may nod, generate affirming voice, or laughs. Such paralinguistic information that is sound information not concerning the contents of conversation and motion information can be obtained from the sound and image collected by the microphones and the camera, respectively.

The information required here specifically includes presence/absence of sound, sound direction, sound duration, face motion, hand motion and magnitude thereof. Such pieces of information will be the elements to form information to sense the atmosphere of the site. By actually recording images and sounds of conversations to get specific examples of such elements, data for learning are formed and accumulated, and accumulated data for model learning are obtained. For each specific example, an answer as to whether interruption of the conversation by an outsider is acceptable or not is collected from the participants. The answers are added to each learning data. Specifically, if interruption by an outsider is acceptable, "1" is added, and if not "0" as answer information is added to each learning data. By machine learning using the learning data, model learning is carried out.

Through such process, a model for determining in what flow of conversation an outsider may interrupt, that is, for determining action agenda by predicting human reaction, can be formed.

Using the model stored in matching model storage unit 78, the action agenda determining information to be output to television control signal output unit 40 is formed at model reference unit 76, by matching process. The process is executed using the motion and paralinguistic information synchronized by sound-motion integrating unit 74 and the matching model. Specifically, the model stored in matching model storage unit 78 is referred to while the feature information obtained from the data of prescribed number of frames consisting of the paralinguistic information and motion information synchronized by sound-motion integrating unit 74 is used as an input, and an output is obtained. The output represents the action agenda as to whether the television may be powered on or not. The signal indicating the action agenda is applied to television control signal output unit 40.

If it is a situation in which interruption of the conversation is acceptable, television control signal output unit 40 outputs a signal for turning on the power of television receiver with the channel set in accordance with the viewing pattern. If it is a situation in which interruption of the conversation is unacceptable, television control signal output unit 40 does not output any signal.

As described above, if the situation does not allow interruption of the conversation, the power of television receiver placed at the site is not turned on and, hence, people in the room will not feel uncomfortable by interruption of the conversation. Further, it is unnecessary to turn off the power that has been automatically turned on, in order to continue conversation. If interruption of conversation is acceptable, the power of television receiver is automatically turned on, and the channel of the program selected in accordance with viewing history is selected. Thus, one cannot miss his/her favorite program.

The auto-control television receiver system shown in FIG. 1 is an example of the system having the action agenda determining apparatus 42 in accordance with an embodiment of the present invention. Action agenda determining apparatus 42 may be mounted not only on the auto-control television receiver system of the present embodiment but also on various apparatuses that operate automatically in response to sound information and motion, such as an automatic minutes recording apparatus capable of not recording conversation not directly related to the proceedings, a camera system automatically moving the lens to a prospective speaker showing his/her intention to speak next, for recording the condition of a discussion session, or a robot having a function requiring talking to a person, for controlling the same.

The configuration of the action agenda determining apparatus in accordance with the present invention is not limited to the one described with reference to the embodiment above. By way of example, a configuration other than that shown in FIG. 2 may be adopted, in accordance with the data format to be used as an input to the model stored in matching model storage unit 78.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention may be used for wide range of industrial products related to human life, such as apparatuses of which action agenda is desirably determined by estimating surrounding situation from sound and image, including electric appliances for home use, human assisting robot and the like.

The invention claimed is:

1. An action agenda determining apparatus for determining an action agenda to be taken, from surrounding situation at a site where human presence is possible, comprising:

model storage unit for storing an action agenda determining model that has learned in advance relation between time-sequence of prescribed feature information related to human motion extracted from images of surroundings and action agenda to be taken; and model reference unit for forming said time-sequence of prescribed feature information from motion images of surroundings and referring to the action agenda determining model stored in said model storage unit, for determining the action agenda to be taken, wherein said model reference unit includes, skin color detecting unit for detecting skin-colored portion from each frame of said motion images, tracking unit for identifying a combination of face and hands of one same person from the skin-colored portions detected by said skin color detecting unit and tracking the face and hands for each combination, of said motion images, and device for determining action agenda by forming, frame by frame, said prescribed feature information from motions of face and hands of each person tracked by said tracking unit, and referring to said action agenda determination model stored in said model storage unit, using said prescribed feature information for a plurality of frames.

2. The action agenda determining apparatus according to claim 1, further comprising:

motion prediction model storage unit for storing motion prediction model related to motions of human face and hands; wherein said tracking unit includes device for identifying a combination of face and hands of one same person from the skin-colored portions detected by said skin color detecting unit, and device for tracking, for each combination identified by said identifying device, motions of face and hands included in the combination, predicted based on the motion model stored in said motion prediction model storage unit.

3. The action agenda determining apparatus according to claim 1, wherein said action addenda determining model includes a sound-integrated type action agenda determining model that has learned in advance relation between the action agenda to be taken and a time sequence of image-sound integrated type feature information having said prescribed feature information related to human motion extracted from surrounding images and prescribed acoustic feature information formed based on sound information obtained from surrounding sound; and said model reference unit includes image-sound integrated type model reference device for determining action agenda to be taken, by forming said image-sound integrated type feature information from surrounding motion images and sounds, and referring to said sound integrated type action agenda determining model stored in said model storage unit using time sequence of said image-sound integrated type feature information.

4. The action agenda determining apparatus according to claim 3, wherein said surrounding sound is received by a microphone and converted to a sound signal; and said prescribed acoustic feature information includes an arbitrary combination of a piece of information representing presence/absence of utterance estimated based on said sound signal, and duration of utterance estimated based on said sound signal.

5. A non-transitory computer readable recording medium recording a computer program causing, when executed by a computer, the computer to operate as an action agenda determining apparatus that performs the following steps comprising:

storing, by a model storage unit, an action agenda determining model that has learned in advance relation between time-sequence of prescribed feature information related to human motion extracted from images of surroundings and action agenda to be taken; and forming, by a model reference unit, said time-sequence of prescribed feature information from motion images of surroundings and referring to the action agenda determining model stored in said model storage unit, for determining the action agenda to be taken, wherein said model reference unit performs additional steps including, detecting, by a skin color detecting unit, skin-colored portion from each frame of said motion images, identifying, by a tracking unit, a combination of face and hands of one same person from the skin-colored portions detected by said skin color detecting unit and tracking the face and hands for each combination, of said motion images, and determining the action agenda by forming, frame by frame, said prescribed feature information from motions of face and hands of each person tracked by said tracking unit, and referring to said action agenda determination model stored in said model storage unit, using said prescribed feature information for a plurality of frames.

* * * * *